Oct. 31, 1939.　　J. O. McKEAN　　2,178,263
WINDING MACHINE
Filed July 23, 1938　　3 Sheets-Sheet 1
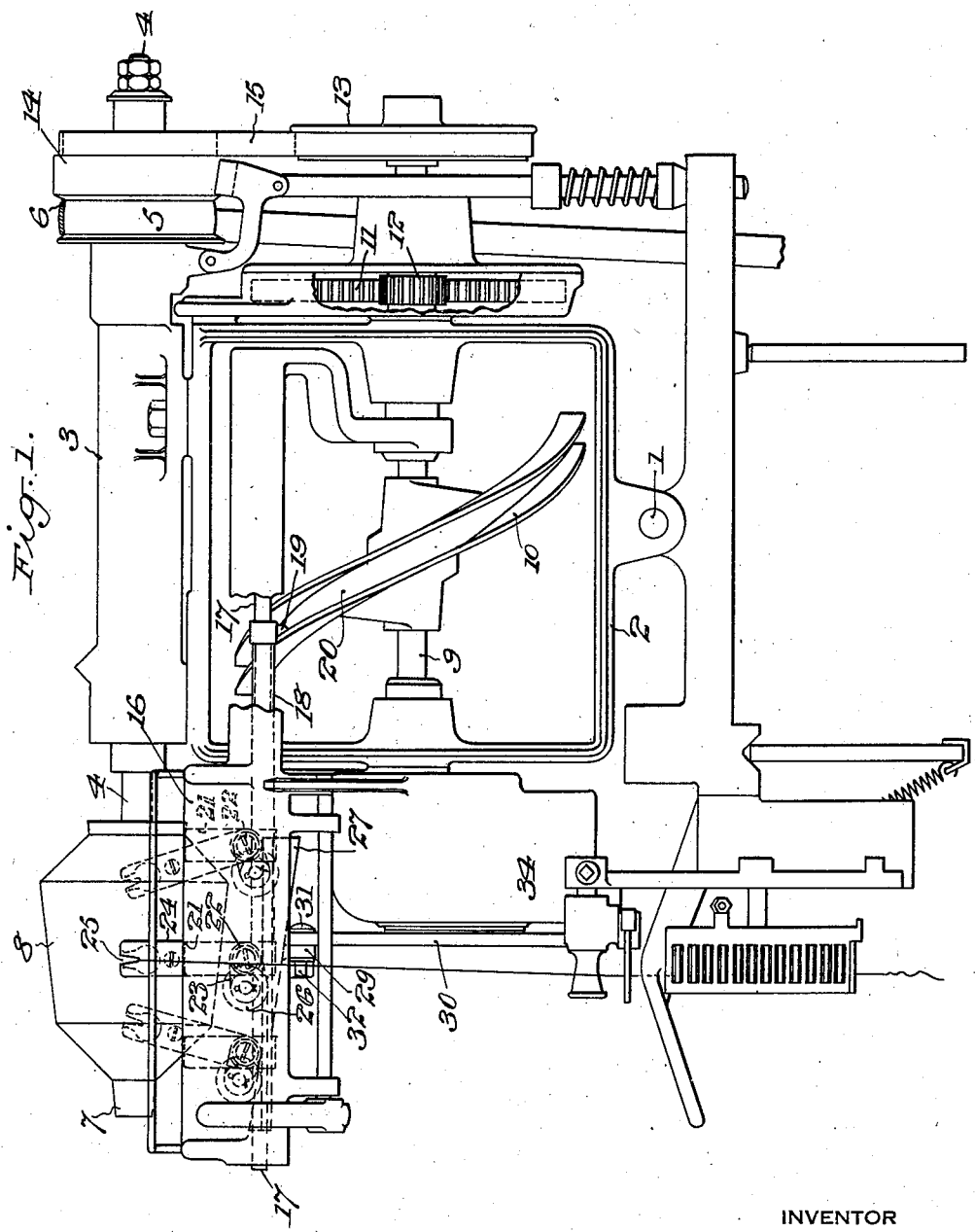
INVENTOR
John O. McKean
BY
ATTORNEYS Oct. 31, 1939.  J. O. McKEAN  2,178,263
WINDING MACHINE
Filed July 23, 1938    3 Sheets-Sheet 2
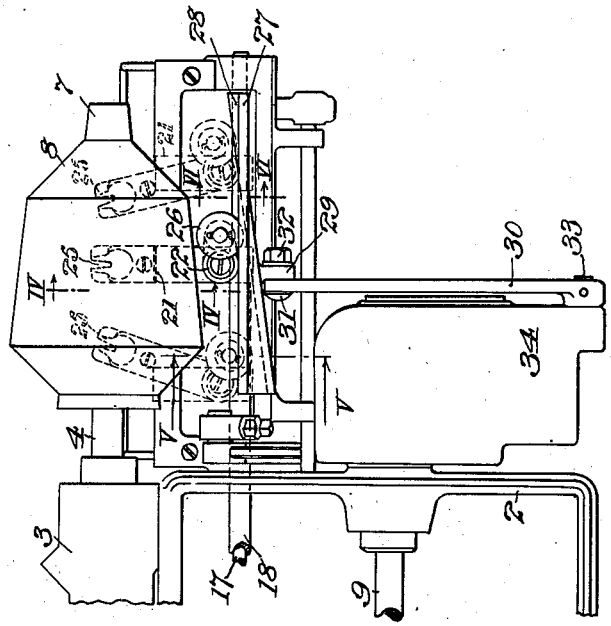
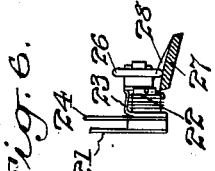
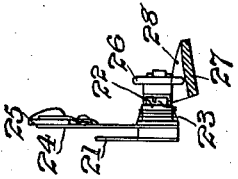
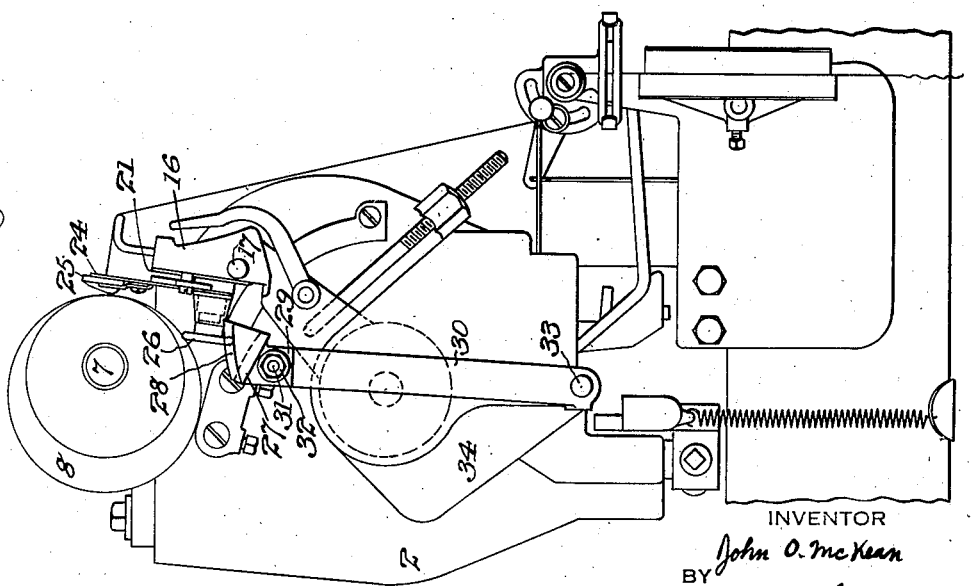
INVENTOR
John O. McKean
BY
Browne Seward
ATTORNEYS Oct. 31, 1939.                J. O. McKEAN                2,178,263
                             WINDING MACHINE
                          Filed July 23, 1938           3 Sheets—Sheet 3
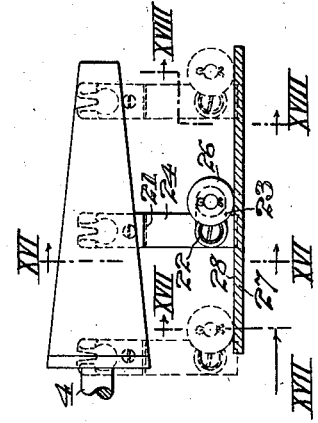
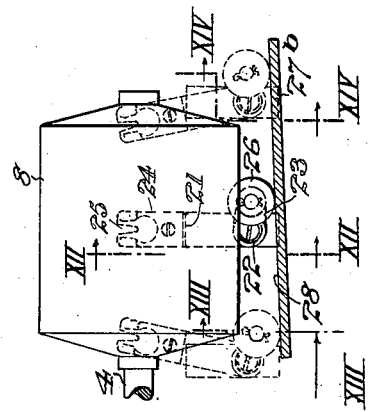
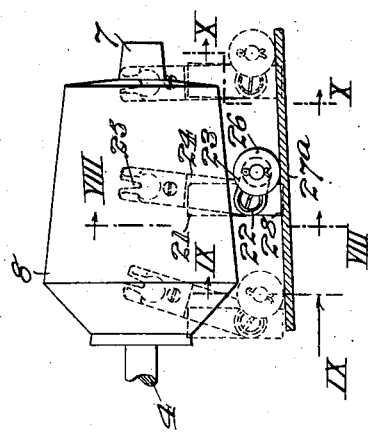
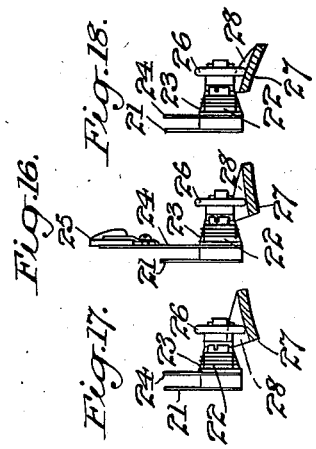
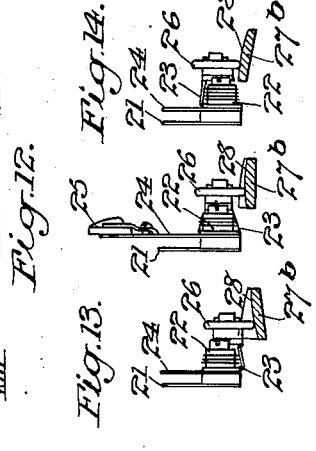
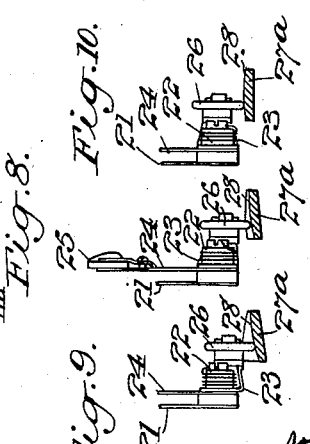
INVENTOR
John O. McKean
BY
Mourn & Seward
ATTORNEYS

UNITED STATES PATENT OFFICE 2,178,263

WINDING MACHINE

John O. McKean, Westfield, Mass.; Hampden National Bank & Trust Co. of Westfield, Massachusetts, Westfield, Mass., executor of said John O. McKean, deceased, assignor to Foster Machine Company, Westfield, Mass., a corporation of Massachusetts Application July 23, 1938, Serial No. 220,915

12 Claims. (Cl. 242—43)

Heretofore where cops have been wound with tapers at one or both ends it has been necessary to provide a number of moving elements which are necessarily subject to considerable wear, thereby causing loose joints and consequently bad adjustment. There has also been difficulty in keeping the moving elements in operating condition, said elements as well being costly to manufacture and in upkeep.

One object of my invention is to produce a winding head having very few parts, of substantial construction and eliminating as far as possible moving parts, thereby extending the life of the head with consequent lessened cost and upkeep.

Another object of my invention is to produce a winding head capable of winding many different shaped cops but being simple in design and construction, easy to adjust and readily and conveniently attached to a regular winding head.

Another object of my invention is to produce a winding head in which any one of several interchangeable stationary elements for controlling the action of the traverse guide may be used to wind a cop of a predetermined shape.

Another object of my invention is to provide means whereby a cop of longer or shorter traverse than the regular cam traverse may be wound without changing the cam itself.

My invention generally comprises a simple, effective, and novel means whereby the throw of the traverse guide is controlled by a stationary element in contact therewith, to gradually change the traverse of the guide as the cop is built up.

My invention more particularly comprises a traverse guide fitted to both rock and bodily reciprocate, and a coacting interchangeable stationary element having a guide contacting surface of a predetermined shape for rocking the guide to produce the required taper or tapers at one or both ends thereof.

My invention still more particularly comprises a rocking and bodily reciprocating traverse guide provided with a traction member as, for instance, a traction wheel arranged to contact with a longitudinally extended helical surface of the stationary element whereby the stationary element directly controls by contact the rocking movement of the traverse guide as it reciprocates on and moves bodily outward with the laterally movable guideway which forms a support for the traverse guide.

My invention also comprises means for universally adjusting the interchangeable stationary element to bring it into proper relationship with respect to the rocking and reciprocating traverse guide.

Practical embodiments of my invention are represented in the accompanying drawings, in which:

Fig. 1 represents a front side elevation of a winding head with my invention applied thereto, illustrating one form of my stationary interchangeable and adjustable element for controlling the rocking movement of the traverse guide;

Fig. 2 represents an end view of the same;

Fig. 3 represents a detail rear side elevation of the winding head with my invention applied thereto, the traverse guide being shown in full lines in an intermediate position, and in dotted lines at both ends of its traverse;

Figs. 4, 5 and 6 represent cross sections taken in the planes of the lines IV—IV, V—V and VI—VI of Fig. 3;

Fig. 7 represents a detail rear side elevation illustrating a second form of the stationary interchangeable and adjustable element arranged in position to cause the traverse guide to wind different tapers on a cop cone, said element being shown in longitudinal vertical section;

Figs. 8, 9, and 10 represent cross sections taken in the planes of the lines VIII—VIII, IX—IX and X—X of Fig. 7;

Fig. 11 represents a detail rear side elevation illustrating a third form of the stationary interchangeable and adjustable element arranged in position to cause the traverse guide to wind a cylindrical cop with end tapers of still a different shape, said element being shown in longitudinal vertical section;

Figs. 12, 13 and 14 represent cross sections taken in the planes of the lines XII—XII, XIII—XIII and XIV—XIV of Fig. 11;

Fig. 15 represents a detail rear side elevation with the stationary element shown in Fig. 3 arranged in the position necessary to keep the traverse guide from rocking as it reciprocates at the beginning of the winding on an empty conical cop core, said element being shown in longitudinal vertical section;

Figs. 16, 17 and 18 represent cross sections taken in the planes of the lines XVI—XVI, XVII—XVII and XVIII—XVIII of Fig. 15;

Fig. 19 represents a detail horizontal section through the traverse guide.

Fig. 20 is a perspective view of an interchangeable stationary element having a straight starting edge.

The winding head which is pivoted to the frame at 1 comprises, generaly, the cam shaft housing 2 and the spindle shaft housing 3. The spindle shaft 4 which is rotatably mounted in its housing 3 may be driven in the usual manner from a suitable source of power, not shown herein, through the pulley 5 and its belt 6. The core 7 of the top cone 8 may be secured in the usual manner on the outer end of the spindle shaft 4.

The shaft 9 of the cam 10 is rotatably mounted in its housing 2 of the winding head. This cam shaft 9 may be driven from the spindle shaft 4 through the gears 11, 12, pulleys 13, 14, and belt 15.

The laterally swinging guideway 16 is pivoted on the cam shaft 9, as usual, to swing toward and away from the cop holder, which guideway is provided with a relatively fixed guide rod 17 on which the hollow traverse guide reciprocating bar 18 slides. The inner end of this bar 18 is provided with a stud or roller 19 located in the groove 20 of the cam 10. The outer end of this bar 18 is provided with an uprising arm 21 carrying a stud 22 on which the spring pressed traverse guide is pivoted for permitting the traverse guide not only to rock with the guideway 16 but also to rock longitudinally with respect to the cop being wound. This traverse guide is provided with a forwardly projecting arm 23 and an uprising arm 24, which latter arm has the usual yarn guide eye 25. The forwardly projecting arm 23 of the traverse guide is provided with a traction member, which, in the present instance, is a traction wheel 26.

The uprising arm 21 at the outer end of the reciprocating bar 18 is guided back and forth in the guideway 16 as usual.

The means which I have shown in Figs. 1 to 6 inclusive for directly controlling by contact the rocking movement of the traverse guide as the cop builds up is herein shown as a stationary interchangeable and adjustable element 27 having a longitudinally elongated helical surface 28 on which the traverse guide traction wheel 26 travels both longitudinally and laterally, as the cop builds up. This element 27 is provided intermediate its ends with a depending lug 29 by means of which lug the element is pivotally secured to the upper end of a bar 30 by a bolt 31 and nut 32, said bar 30 being fixed at its lower end on a fixed stud 33 projecting from the cover extension 34 of the winding head. The member 27 is held stationary in selected position by tightening of the bolt 31 and nut 32.

In this form shown in Figs. 1 to 6, inclusive, the interchangeable stationary element or plate 27 is shown in position to cause the traverse guide to rock as it reciprocates, to wind a cop cone having its ends oppositely tapered at a certain angle.

In the form shown in Figs. 7 to 10 inclusive, the substituted stationary element 27a is arranged in a position to cause the traverse guide to rock during its reciprocation to wind a cop cone which will be slightly tapered at its small end and tapered approximately the maximum amount at its large end.

In the form shown in Figs. 11 to 14 inclusive, the substituted stationary element 27b is shown as arranged in position to cause the traverse guide to rock in both directions in its reciprocation, to wind a cylindrical cop beveled oppositely at both ends; each end being convex.

In Figs. 15 to 18 inclusive, the stationary element 27 is shown as being arranged in the position necessary to keep the traverse guide from rocking as it reciprocates at the beginning of the winding on an empty conical cop core.

From the above description it will be seen that the selected stationary element may be adjusted to different positions with relation to the cop so that the cop may be wound with a predetermined taper at one or both ends, and also a longer or shorter cop may be wound without changing the traverse cam.

It will also be seen that by making the stationary element interchangeable with other stationary elements of various forms a cop of practically any predetermined shape may be built up.

It will also be seen that the longitudinal starting edge of the friction member contacting surface of the stationary element may be substantially parallel to the horizontal plane passing through the longitudinal axis of the cop holder so that the maximum throw of the traverse guide may be obtained at the starting of the winding of the cop but when the yarn guiding end of the guide traverses a greater or lesser distance than the traverse of the cam the starting edge of the said surface is inclined either in one direction or the other, to give a greater or lesser traverse.

It will also be seen that I have shown only a few of the many different shapes of cops which may be wound by using my interchangeable stationary element having the traverse guide contacting surface.

It is evident that various changes may be resorted to in the construction, form and arrangement of the several parts without departing from the spirit and scope of my invention, and hence I do not intend to be limited to the particular embodiments herein shown and described, but

What I claim is:

1. In combination, a rotary cop holder, a guideway movable toward and away therefrom, a rocking traverse guide bodily reciprocable in the guideway and provided with a traction member, and a stationary element having a surface in contact with said traction member, said surface being shaped to rock the guide for controlling its throw as the cop builds up.

2. In combination, a rotary cop holder, a guideway movable toward and away therefrom, a rocking traverse guide bodily reciprocable in the guideway and provided with a traction wheel, and a stationary element having a surface in contact with said traction wheel, said surface being shaped to rock the guide for controlling its throw as the cop builds up.

3. In combination, a rotary cop holder, a guideway movable toward and away therefrom, a rocking traverse guide bodily reciprocable in the guideway and provided with a traction member, and a stationary element having an elongated helical surface in contact with the traction member, said surface being shaped to rock the guide for controlling its throw as the cop builds up.

4. In combination, a rotary cop holder, a guideway movable toward and away therefrom, a rocking traverse guide bodily reciprocable in the guideway and provided with a traction wheel, and a stationary element having an elongated helical surface in contact with the traction wheel, said surface being shaped to rock the guide for controlling its throw as the cop builds up.

5. In combination, a rotary cop holder, a guideway movable toward and away therefrom, a traverse guide bar reciprocable in the guideway, a traverse guide pivoted on said bar and having a traction member, and a stationary element having a surface in contact with the traction member, said surface being shaped to rock the guide to control its throw as the cop builds up.

6. In combination, a rotary cop holder, a guideway movable toward and away therefrom, a traverse guide bar reciprocable in the guideway, a traverse guide pivoted on said bar and having a traction wheel, and a stationary element having a surface in contact with the traction wheel, said surface being shaped to rock the guide to control its throw as the cop builds up.

7. In combination, a rotary cop holder, a guideway movable toward and away therefrom, a traverse guide bar reciprocable in the guideway, a traverse guide pivoted on said bar and having a traction member, and a stationary element having an elongated helical surface in contact with the traction member, said surface being adapted to rock the guide to control its throw as the cop builds up.

8. In combination, a rotary cop holder, a guideway movable toward and away therefrom, a traverse guide bar reciprocable in the guideway, a traverse guide pivoted on said bar and having a traction wheel, and a stationary element having an elongated helical surface in contact with the traction wheel, said surface being adapted to rock the guide to control its throw as the cop builds up.

9. In combination, a rotary cop holder, a guideway movable toward and away therefrom, a rocking traverse guide bodily reciprocable in the guideway and provided with a traction member, and a stationary element having a surface in contact with the traction member, said surface being shaped to control the throw of the guide as the cop builds up, said stationary element being adjustable to different positions with relation to the cop so as to vary the amount of taper at the ends of the cop.

10. In combination, a rotary cop holder, a guideway movable toward and away therefrom, a rocking traverse guide bodily reciprocable in the guideway and provided with a traction member, and a stationary element having a surface in contact with the traction member, said surface being shaped to control the throw of the guide as the cop builds up, said stationary element being interchangeable with other stationary elements of various forms to provide for building up cops of various predetermined shapes.

11. In combination, a rotary cop holder, a guideway movable toward and away therefrom, a rocking traverse guide bodily reciprocable in the guideway and provided with a traction member, and a stationary element having a surface in contact with the traction member, said surface being shaped to control the throw of the guide as the cop builds up, the longitudinal starting edge of the said surface being substantially parallel to the horizontal plane passing through the longitudinal axis of the cop holder.

12. In combination, a rotary cop holder, a guideway movable toward and away therefrom, a rocking traverse guide bodily reciprocable in the guideway and provided with a traction member, and a stationary element having a surface in contact with the traction member, said surface being shaped to control the throw of the guide as the cop builds up, the longitduinal starting edge of the said surface being inclined, and the remainder of the surface being so shaped as to produce a greater traverse of the guide at the start than as the cop builds up.

JOHN O. McKEAN.